June 21, 1927.
N. W. TRAUTNER
GREASE CUP
Filed April 4, 1925
1,632,934
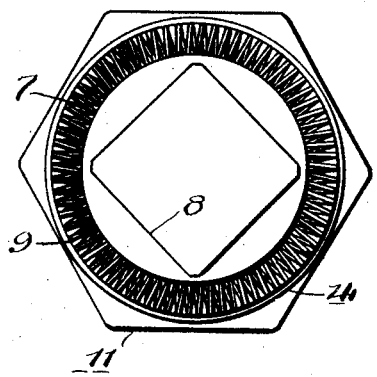
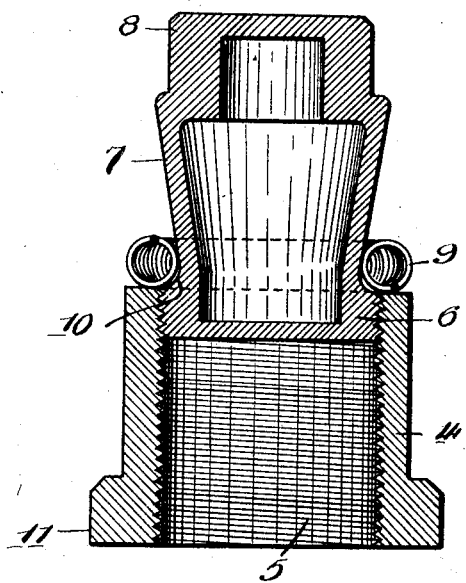
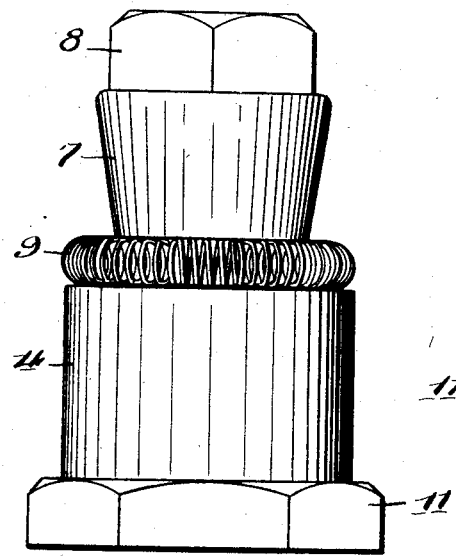
Inventor
Nicholas W. Trautner
By Stryker & Stryker
Attorneys Patented June 21, 1927.

1,632,934

UNITED STATES PATENT OFFICE.

NICHOLAS W. TRAUTNER, OF ST. PAUL, MINNESOTA.

GREASE CUP.

Application filed April 4, 1925. Serial No. 20,656.

This invention relates to grease cups particularly, although not exclusively, adapted for use upon railway locomotives.

As is well known, it is common practice to provide machines of many kinds with grease cups or receptacles connected by suitable tubes or passageways with the bearings to be lubricated, and to furnish in each receptacle a plunger which may be periodically operated to force lubricant upon the bearings. In one type of such lubricating devices the plungers are threaded in the cups. Due to the vibration of the machines these plungers frequently work out of the cups, causing improper lubrication, and are frequently lost during the travel of the train with resulting expense of replacing plungers. Attempts have been made to prevent loss of the plungers by providing springs which press upon the plungers from within the cups, but as far as applicant is aware, none of these devices are suitable for use on the type of cup used upon railway rolling stock.

It is my object to provide a novel, simple and efficient device adapted to prevent the loss of plungers from grease cups suitable for railway use.

The accompanying drawings illustrate the best form of my device at present known to me. In the drawings, Figure 1 is a plan view of my improved grease cup; Fig. 2 is a central, vertical section through the same and Fig. 3 is a side elevation of the device.

As illustrated, I provide a grease receptacle or body 4, adapted to be mounted in any convenient place upon a machine, where it may be connected by suitable tubes or passageways with the bearings to be lubricated. An axial bore 5 in the cup body 4 is threaded to fit a plunger 6 for forcing the grease to the bearings. A conical portion 7 on the plunger 6 is arranged with its periphery tapering downward gradually, and above the portion 7 is a squared head 8 adapted to be turned by a suitable wrench. Encircling the conical portion 7 of the plunger is an endless, helical spring 9 adapted to exert inward, radial pressure about the plunger. When the plunger 6 is withdrawn from the body 4, this spring 9 is maintained on the conical surface by engagement with an angular shoulder 10 at the upper extremity of the plunger threads.

In use, to fill the body 4 with grease, it is only necessary to remove the plunger 6 by unscrewing the same from the threaded bore 5. According to the present railway practice, bars of hard grease are furnished to fit the bores 5 of the grease cups, and my invention requires no departure from the practice. After inserting the end of a grease bar in the body 4, the projecting portion is severed and the plunger 6 is turned into the threaded bore 5. No pressure is exerted by the spring 9 upon the body 4 until the plunger reaches approximately the position shown in Figure 2, but further turning of the plunger into the body presses the spring 9 upon the portion 7 of larger diameter and causes the spring to exert pressure upon the open end of the cup body 4. The spring 9 now opposes turning of the plunger by frictional engagement with the body 4 and also opposes any lateral movement of the plunger in the body of the cup, which otherwise might be permitted. As more lubricant is required upon the bearings, the head 8 is merely turned to carry the plunger into the body 4 and expel grease therefrom.

It will be noted that the spring 9 is compact and inconspicuous, has marked efficiency in gripping the plunger, and possesses the further advantage of in no way interfering with inserting the plunger in the cup.

Having described my invention what I claim as new and desire to protect by Letters Patent is:

1. A grease cup comprising, a threaded body having an end opening, a plunger threaded to fit said body and adapted to be turned into the same, a conical portion arranged on said plunger to extend, small end foremost, into said opening, and a circular spring disposed about said conical portion and in engagement with the open end of said body, said spring being arranged to resiliently oppose turning of said plunger in said body.

2. A grease cup comprising, a hollow body having an end opening, a plunger adapted to be forcibly extended into said body, a conical portion arranged on said plunger to be expended, small end foremost, into said body, and an annular spring disposed about said conical portion to exert inward, radial pressure thereon, said spring being disposed to abut against the open end of said body to frictionally oppose withdrawal of said plunger therefrom.

3. A grease cup comprising a hollow body having an end opening, a plunger adapted to be forcibly extended into said body, a conical portion arranged on said plunger to be extended, small end foremost, into said body, an endless, coiled spring disposed about said conical portion to exert inward, radial pressure thereon, and an annular shoulder adjacent to the smaller end of said conical portion adapted to maintain said spring on said plunger, said spring being disposed to abut against the open end of said body to frictionally oppose withdrawal of said plunger therefrom.

4. A grease cup comprising, an internally threaded body having an end opening, a plunger threaded to fit said body and adapted to be turned into the same, a tapered portion arranged on said plunger to extend, small end foremost, into said opening, an annular spring in engagement with said tapered portion and with the end of said body, said spring being arranged to resiliently oppose turning of said plunger in said body, and an annular abutment disposed on the plunger between its threaded portion and the smaller end of said tapered portion whereby said spring is maintained on the plunger when the same is removed from said body.

In testimony whereof, I have hereunto signed my name to this specification.

NICHOLAS W. TRAUTNER.